United States Patent
D'Acquisto

(10) Patent No.: US 11,122,189 B2
(45) Date of Patent: Sep. 14, 2021

(54) WILDLIFE CAMERA WITH EMF SHIELDING

(71) Applicant: Andrae T. D'Acquisto, Bellevue, IA (US)

(72) Inventor: Andrae T. D'Acquisto, Bellevue, IA (US)

( * ) Notice: Subject to any disclaimer, the term of this patent is extended or adjusted under 35 U.S.C. 154(b) by 0 days.

(21) Appl. No.: 16/501,999

(22) Filed: Jul. 18, 2019

(65) Prior Publication Data

US 2020/0036871 A1 Jan. 30, 2020

Related U.S. Application Data

(60) Provisional application No. 62/764,268, filed on Jul. 25, 2018.

(51) Int. Cl.
*H04N 5/225* (2006.01)
*H04N 7/18* (2006.01)
*H04N 5/38* (2006.01)

(52) U.S. Cl.
CPC .......... *H04N 5/2252* (2013.01); *H04N 5/38* (2013.01); *H04N 7/183* (2013.01)

(58) Field of Classification Search
CPC .......... H04N 5/2252; H04N 5/38; H04N 7/183
See application file for complete search history.

(56) References Cited

U.S. PATENT DOCUMENTS

| | | | |
|---|---|---|---|
| 2007/0126872 A1* | 6/2007 | Bolotine | H04N 5/2252 348/151 |
| 2011/0260949 A1* | 10/2011 | Ahn | H01J 11/12 345/1.3 |
| 2012/0113317 A1* | 5/2012 | Anderson | H04N 5/2252 348/373 |
| 2012/0140107 A1* | 6/2012 | Anderson | G03B 17/02 348/341 |
| 2016/0127641 A1* | 5/2016 | Gove | G06T 1/0007 348/143 |
| 2018/0020920 A1* | 1/2018 | Ermilov | A61B 5/14546 600/317 |
| 2019/0005343 A1* | 1/2019 | Srivastava | G06K 9/6292 |
| 2019/0147620 A1* | 5/2019 | Pinel | G06K 9/6202 382/159 |

* cited by examiner

*Primary Examiner* — Zaihan Jiang

(57) ABSTRACT

The present invention is directed to a wildlife surveillance camera comprising EMF shielding material that substantially reduces the electromagnetic field generated by said camera.

5 Claims, No Drawings

WILDLIFE CAMERA WITH EMF SHIELDING

RELATED APPLICATIONS

This application claims benefit of U.S. Provisional Application Ser. No. 62/764,268 filed on Jul. 24, 2018, which is incorporated herein by reference.

FIELD OF THE INVENTION

The present invention generally pertains to motion sensing cameras for monitoring and photographing wildlife and more specifically pertains to such a camera that includes EMF shielding to prevent animals from sensing the electrical energy emissions generated by said camera.

BACKGROUND OF THE INVENTION

There are a wide variety of wildlife cameras for use in a variety of activities. Wildlife observation cameras are usually left unattended in an area where wildlife is expected, and a motion detector is often used for triggering the camera when an animal appears. Wildlife cameras typically include a motion detector or some other camera-triggering device; weather protection; an illuminating flash or infrared flash for taking pictures at night; and logic for adjusting the camera's function under changing conditions such as daylight, temperature, and size of animal and/or speed of animal.

Every electronic device, including cameras and cell phones, generate electromagnetic ("EM") energy. Research suggests animals can sense the electromagnetic field (EMF) produced by such devices. An abundance of other research has been conducted regarding how animals react to EMF. Grazing deer and cattle are known to generally align themselves with geomagnetic north and south. But when the animals encountered EMF created by high-tension power lines, their ability to align themselves is interrupted. Although it can be proven that mammals sense and react to EMFs, scientists aren't sure exactly how. Sharks and some other fish have special organs specifically designed to pick up electromagnetic impulses, and many birds rely heavily on magnetic fields to guide their annual migrations. A corresponding mechanism has yet to be discovered in game animals such as deer and elk, but a popular theory is that some animals may perceive magnetic fields as visual patterns. This could explain the mysterious sixth sense that bucks are believed to have. In fact, many seasoned hunters believe that deer are actually spooked by wildlife cameras, and especially those that transmit photos wirelessly, because the can sense the EM field generated by such devices.

It is therefore an object of the present invention to improve on the state of the art by providing a wildlife camera with EM shielding such that the EMF generated by such devices is dramatically reduced and/or softened such that said devices go largely undetected by wildlife, and particularly deer.

SUMMARY OF THE INVENTION

The present invention generally pertains to motion sensing cameras for monitoring and photographing wildlife and more specifically pertains to such a camera that includes EM shielding to prevent animals from sensing the electrical energy emissions generated by said camera.

DETAILED DESCRIPTION OF THE INVENTION

A photon is energy. Photons can carry varying degrees of energy. The amount of energy photons carry affects their behavior. Photons with low energy travel together as "waves" while groups of photons with a higher degree of energy behave like "particles". The higher the energy of these photons, the easier they are to detect and the more dangerous they become. Electromagnetic Radiation (EMR) is comprised of traveling photons. Since the behavior of the photons varies with their associated energy level, so does the level of EMR.

The lowest energy waves in the electromagnetic spectrum are referred to as Extremely Low Frequency (ELF) and with a little bit more energy, radio waves. The highest energy waves in the electromagnetic spectrum are called gamma rays. Gamma rays can penetrate and kill cells; sometimes they are used for cancer treatment. Without the proper EMF protection, you can be harmed by gamma rays. The Extremely Low Frequency (ELF) and radio waves in contrast with the gamma waves represent the other end of the electromagnetic spectrum. The lowest end of the spectrum are considered non-thermal and thermal emissions that initiate low and high current. Wildlife cameras as used herein means any photo or video recording device with can be left in areas frequented by wildlife. They are generally battery or solar powered and store photos and/or videos on a hard drive, SD card or other recording device. Such wildlife cameras can also be adapted to transmit photos and/or videos wirelessly. Electronic devices such as wildlife cameras, especially those that are equipped with WiFi for sending photos and videos wirelessly, generate levels of ELF and Radio Frequency (RF) Electromagnetic Radiation (EMR).

Studies have found that fresh deer beds in the snow faced in a magnetic north-south direction, much more often than other direction. Other studies have also that animals can 'sense' electromagnetic radiation. Other animals use electromagnetic radiation to migrate. There is no question that animals sense electromagnetic radiation, and no question that electronic devices such as wildlife cameras give such radiation off. And when animals can sense the EM field/radiation generated by electronic devices, such as wildlife cameras, there is an increased incidence of said animals becoming aware of and/or being alarmed by such devices. That may cause the animals to actually avoid the area in which the wildlife camera is located.

The present invention obviates many of the aforementioned deficiencies by providing a wildlife camera with electromagnetic shielding. Electromagnetic shielding reduces the electromagnetic field in a space by blocking the field with barriers made of conductive or magnetic materials. Shielding is typically applied to enclosures to isolate electrical devices from their surroundings, and to cables to isolate wires from the environment through which the cable runs. In one embodiment of the invention, the electromagnetic shielding also comprises RF shielding that blocks radio frequency electromagnetic radiation.

In one embodiment, the EMF shielding utilized reduces the coupling of radio waves, electromagnetic fields and electrostatic fields. Shielding material reflects the radiations, conducting materials like metals can also be used but they are bulky, so any material which shows some conductivity and is flexible can be used as a material for shielding like flexible graphite etc. A conductive enclosure can also be used to block electrostatic fields, also known as a Faraday cage, which is included within the definition of EMF shielding herein. The amount of reduction depends very much upon the material used, its thickness, the size of the shielded volume and the frequency of the fields of interest and the size, shape and orientation of apertures in a shield to an incident electromagnetic field.

If testing a wildlife camera or recording device for EMF protection one can use an EMF meter to measure EMFs before and after the use of the EMF shielding. This ability to measure EMFs helps measure the benefits of EMF shielding. Below are some examples of EMF protection products that provide a physical barrier to EMFs.

Electromagnetic shields help block EMFs with barriers made of conductive or magnetic materials that can block EMFs from wildlife cameras or other recording devices. These materials can be used to wrap or cover the devices to greatly reduce magnetic field emissions.

Shielding fabrics designed electronic devices, including wildlife cameras and other recording devices can also be employed. These fabrics will typically soften the EMF signal, but usually do not completely block it.

Typical materials used for electromagnetic shielding include sheet metal, metal screen, and metal foam. Any holes in the shield or mesh must be significantly smaller than the wavelength of the radiation that is being kept out, or the enclosure will not effectively approximate an unbroken conducting surface.

Another commonly used shielding method, especially with electronic goods housed in plastic enclosures, is to coat the inside of the enclosure with a metallic ink or similar material. The ink consists of a carrier material loaded with a suitable metal, typically copper or nickel, in the form of very small particulates. It is sprayed on to the enclosure and, once dry, produces a continuous conductive layer of metal, which can be electrically connected to the chassis ground of the equipment, thus providing effective shielding.

RF shielding enclosures filter a range of frequencies for specific conditions. Copper is used for radio frequency (RF) shielding because it absorbs radio and electromagnetic waves. Properly designed and constructed copper RF shielding enclosures satisfy most RF shielding needs for wildlife cameras.

Electromagnetic radiation consists of coupled electric and magnetic fields. The electric field produces forces on the charge carriers (i.e., electrons) within the conductor. As soon as an electric field is applied to the surface of an ideal conductor, it induces a current that causes displacement of charge inside the conductor that cancels the applied field inside, at which point the current stops.

Similarly, varying magnetic fields generate eddy currents that act to cancel the applied magnetic field. (The conductor does not respond to static magnetic fields unless the conductor is moving relative to the magnetic field.) The result is that electromagnetic radiation is reflected from the surface of the conductor: internal fields stay inside, and external fields stay outside.

Several factors serve to limit the shielding capability of real RF shields. One is that, due to the electrical resistance of the conductor, the excited field does not completely cancel the incident field. Also, most conductors exhibit a ferromagnetic response to low-frequency magnetic fields, so that such fields are not fully attenuated by the conductor. Any holes in the shield force current to flow around them, so that fields passing through the holes do not excite opposing electromagnetic fields. These effects reduce the field-reflecting capability of the shield.

Although the choice of EMF shielding material is not limiting in the context of the invention, there are several commercially available materials that are particularly useful.

Pre-tin plated steel is an ideal, low cost solution that works well from lower frequencies in the kHz range through frequencies into the lower GHz range. Carbon steel has a permeability value in the lower hundreds range which provides the low-frequency magnetic shielding property that is missing in alloy 770, copper, or aluminum.

Copper alloy 770, more commonly known as alloy 770, is a copper, nickel, zinc alloy used in EMF shielding applications mainly for its corrosion resistant properties. The alloy's unified numbering system designation is UNS C77000. The base material is inherently aesthetic and does not require post plating to make it corrosion resistant or solderable. The material works well as an EMF shield beginning in the mid kHz range up into the GHz.

Copper is the most reliable metal in EMF shielding because it is highly effective in attenuating magnetic and electrical waves. Due to the versatility of this metal it can be easily fabricated along with its alloys brass, phosphorous bronze, and beryllium copper. These metals typically cost more than the alternative shielding alloys of pre-tin plated steel or copper alloy 770 but, on the other hand, offer a higher conductivity. Phosphorous bronze and beryllium copper are more commonly used in contact applications for batteries or springs due to their elasticity.

Although aluminum does pose a few fabrication challenges, it is still an excellent choice for a number of applications mostly due to its non-ferrous properties, its strength-to-weight ratio, and its high conductivity. Aluminum has nearly 60 percent of conductivity when compared with copper, however, using this metal needs precise attention to its galvanic corrosion and oxidation properties.

The camera of the invention also optionally has an aim point feature that allows the user to use an app on a phone or other electronic device to optimize camera placement for taking photos and/or video of specific game. More specifically, a dot or other sighting symbol appears on the electronic device showing the exact location where the camera is aimed. The aiming symbol, dot or crosshair on the app allows the user to set the ideal location to aim the camera to capture the best photos and/or videos eliminating any guesswork in camera placement.

Although the invention is described with reference to a preferred embodiment, it should be appreciated by those of ordinary skill in the art that various modifications are well within the scope of the invention. Therefore, the scope of the invention is to be determined by reference to the following claims.

The invention claimed is:

1. A motion sensing wildlife surveillance camera which comprises a camera within an enclosure, wherein said wildlife camera is adapted to transmit photos and videos wirelessly from a remote location, said wildlife surveillance camera comprising an electromagnetic field and radio frequency shielding material that substantially softens and/or reduces the electromagnetic field and radio frequency emissions generated by said camera such that during operation said camera goes largely undetected by wildlife, wherein said shielding material comprises one or more conductive or magnetic materials that can substantially soften or block electromagnetic field and radio frequency emissions generated from said camera, wherein said shielding is on the outside of said enclosure, on the inside of said enclosure, or imbedded within the enclosure.

2. The wildlife camera of claim 1 wherein said shielding material comprises sheet metal, metal screen, and/or metal foam.

3. The wildlife camera of claim 1 wherein said camera comprises an antenna and a substantial portion of the antenna is covered by said electromagnetic field and radio frequency shielding.

4. The wildlife camera of claim 1 wherein said electronic device is selected from a smart phone or tablet.

5. The wildlife camera of claim 1 further comprising an aim point feature configured to utilize an app on an electronic device to optimize camera placement for taking photos and/or video of specific game.

* * * * *